US010639228B1

United States Patent
Tavares et al.

(10) Patent No.: US 10,639,228 B1
(45) Date of Patent: May 5, 2020

(54) WEARABLE COMPUTING SYSTEM FOR ASSISTING A VISUALLY IMPAIRED USER

(71) Applicants: Noah Park Tavares, Burlingame, CA (US); Pranav Skanda Ram, Palo Alto, CA (US); Maximillian Chuan-Qi Shen, Redwood City, CA (US)

(72) Inventors: Noah Park Tavares, Burlingame, CA (US); Pranav Skanda Ram, Palo Alto, CA (US); Maximillian Chuan-Qi Shen, Redwood City, CA (US)

(73) Assignee: Stria Labs, Inc., Burlingame, CA (US)

( * ) Notice: Subject to any disclaimer, the term of this patent is extended or adjusted under 35 U.S.C. 154(b) by 0 days.

(21) Appl. No.: 16/285,806

(22) Filed: Feb. 26, 2019

(51) Int. Cl.
*A61H 3/06* (2006.01)
*G01C 21/36* (2006.01)
*G08B 21/02* (2006.01)
*A61H 3/00* (2006.01)

(52) U.S. Cl.
CPC ......... *A61H 3/061* (2013.01); *G01C 21/3626* (2013.01); *G08B 21/02* (2013.01); *A61H 2003/007* (2013.01); *A61H 2003/063* (2013.01); *A61H 2201/0184* (2013.01); *A61H 2201/165* (2013.01); *A61H 2201/5025* (2013.01); *A61H 2201/5084* (2013.01); *G01C 21/3629* (2013.01); *G01C 21/3652* (2013.01)

(58) Field of Classification Search
CPC ..... A61H 3/061; G01C 21/3626; G08B 21/02
See application file for complete search history.

(56) References Cited

U.S. PATENT DOCUMENTS

| 4,212,116 | A | * | 7/1980 | Hajduch | G09B 21/007 434/255 |
| 4,648,710 | A | * | 3/1987 | Ban | G01S 17/06 135/911 |
| 4,712,003 | A | * | 12/1987 | Ban | A61F 9/08 250/215 |
| 5,838,238 | A | * | 11/1998 | Abita | A61H 3/061 340/573.1 |
| 2019/0307632 | A1 | * | 10/2019 | Yashiro | A61H 3/06 |

* cited by examiner

*Primary Examiner* — Sisay Yacob
(74) *Attorney, Agent, or Firm* — Patent Ingenuity, P.C.; Samuel K. Simpson (57) ABSTRACT

A system is provided to minimize, or potentially eliminate, veering of a visually impaired user that is walking along a linear path. The system includes a wearable apparatus to be worn by a user. Further, the system includes a sensor, which measures ambulatory motion of the user along a linear path, that adheres to the wearable apparatus. The system also includes a processor that adheres to the wearable apparatus. The processor determines ambulatory motion deviation from the linear path according to the ambulatory motion being in excess of a predetermined angular threshold, and also determines according to one or more veering detection criteria if the ambulatory motion deviation is a veering motion or a purposeful turn. Finally, the system includes a left non-visual output device and a right non-visual output device that adheres to a right side of the wearable apparatus.

20 Claims, 10 Drawing Sheets

WEARABLE COMPUTING SYSTEM FOR ASSISTING A VISUALLY IMPAIRED USER

BACKGROUND

1. Field

This disclosure generally relates to the field of computing devices. More particularly, the disclosure relates to wearable computing devices that assist visually impaired users.

2. General Background

A common problem for visually impaired pedestrians is maintaining a straight path while walking. In other words, a visually impaired pedestrian may unknowingly veer from to one side (i.e., to the right or to the left) of a straight path. For example, if a visually impaired pedestrian wants to cross a street via a crosswalk, his or her safety heavily depends on being able to walk straight across the crosswalk, with little veering; too much veering could easily lead to the visually impaired pedestrian walking into vehicular traffic, posing the specter of life-threatening or serious bodily injury occurrences. As another example, a visually impaired pedestrian may be walking on a sidewalk. If the visually impaired pedestrian veers too much, he or she could fall off of the sidewalk into a street with moving vehicles—another potentially disastrous situation.

Conventional solutions have been futile in dealing with the veering problem. For example, a common solution is a cane. But effective use of a cane relies on contact with an obstacle in the path of the visually impaired pedestrian; such obstacles are not typically present in a crosswalk, or on a sidewalk. As another example, a service animal is often used by visually impaired pedestrians. Yet, a service animal typically moves at a distance, via a leash, from the visually impaired pedestrian. In other words, the service animal may be moving straight along a linear path, but nothing prevents the visually impaired pedestrian from veering behind the service animal on the path.

As a result, conventional solutions are quite ineffective in preventing, or minimizing, the problem of a visually impaired person veering along a relatively straight path.

SUMMARY

In one aspect of the disclosure, a system is provided to minimize, or potentially eliminate, veering of a visually impaired user that is walking along a linear path. The system includes a wearable apparatus to be worn by a user. Further, the system includes a sensor, which measures ambulatory motion of the user along a linear path, that adheres to the wearable apparatus.

The system also includes a processor that adheres to the wearable apparatus. The processor determines ambulatory motion deviation from the linear path according to the ambulatory motion being in excess of a predetermined angular threshold, and also determines, according to one or more veering detection criteria, if the ambulatory motion deviation is a veering motion or a purposeful turn.

Finally, the system includes a left non-visual output device that adheres to a left side of the wearable apparatus such that the left non-visual output device is positioned in proximity to a left side of the user, in addition to a right non-visual output device that adheres to a right side of the wearable apparatus such that the right non-visual output device is positioned in proximity to a right side of the user.

The left non-visual output device receives, from the processor, a non-visual output command based on the ambulatory motion deviation being a left veering motion to a left position of the linear path, and, as a result, emits the non-visual output command. Conversely, the right non-visual output device receives, from the processor, the non-visual output command based on the ambulatory motion deviation being a right veering motion to a right position of the linear path, and, as a result, emits the non-visual output command.

In another aspect of the disclosure, the system may have a plurality of wearable apparatuses, as opposed to just a single wearable apparatus. The sensor, processor, left non-visual output device, and right non-visual output device may each adhere to at least one of the plurality of wearable apparatuses.

In yet another aspect of the disclosure, a computer program product includes a non-transitory computer useable storage device that has a computer readable program. When executed on a computer, the computer readable program causes the computer to perform the functionality of the foregoing system.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A wearable computing system is provided to assist a visually impaired user when moving (e.g., walking) along a linear path (e.g., crosswalk, sidewalk, etc.). Upon determining that movement along a linear path has been initiated, the wearable computing system calculates the trajectory of the linear path. Moreover, the wearable computing system determines if the user has veered (i.e., unintentionally deviated) or purposefully turned from the linear path. If the user has indeed veered from the linear path, the wearable computing system emits a non-visual output (e.g., tactile, audible, etc.) on the side (e.g., left or right) of the user to guide the user back to the linear path. In other words, the wearable computing system differentiates between veering and purposeful turns to avoid false positives, which could otherwise result in numerous non-visual outputs for turning motions by the user actually intended as turns.

Figure 1:
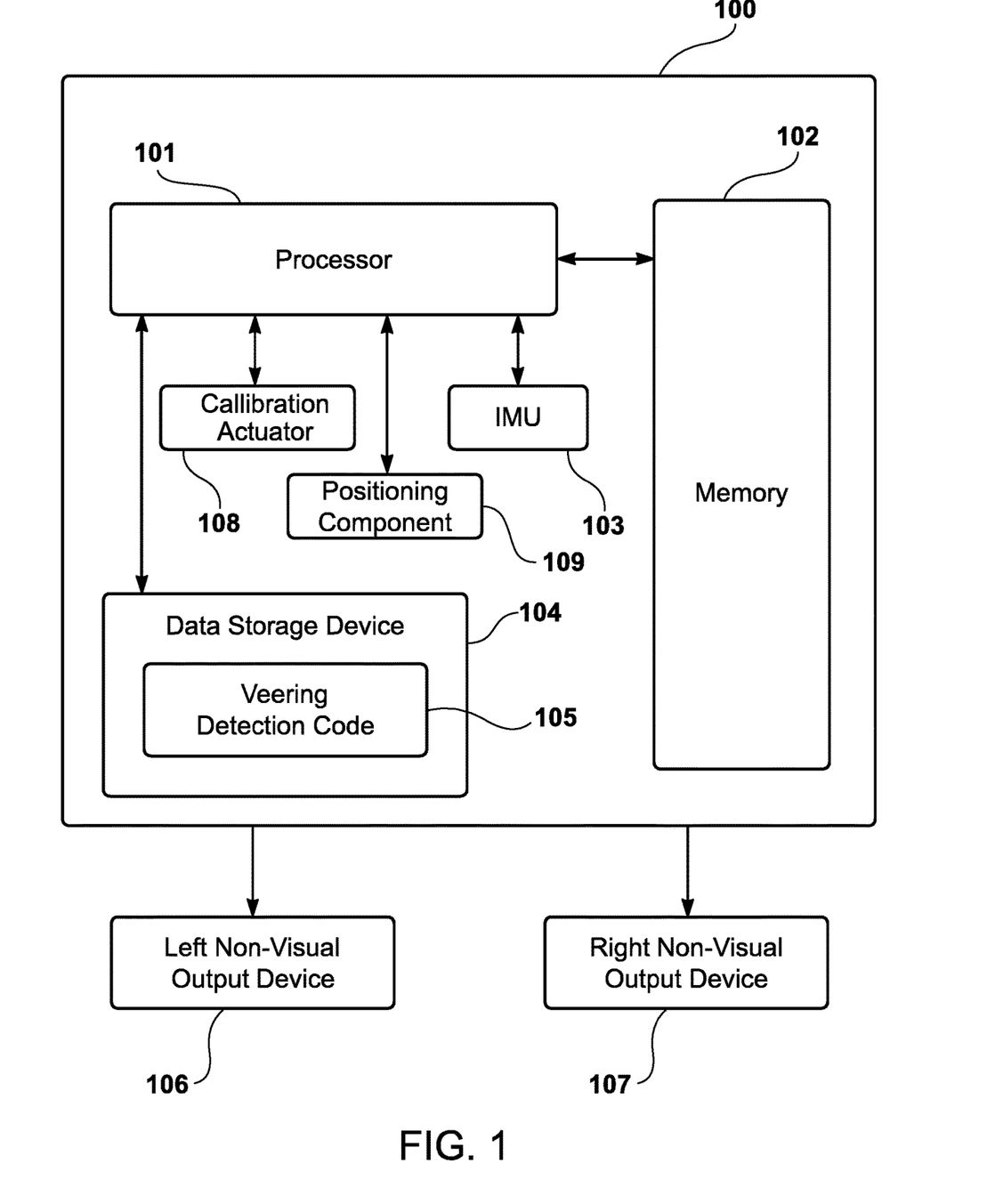
FIG. 1 illustrates a veering detection system that detects veering of a user from a linear path.

FIG. 1 illustrates a veering detection system 100 that detects veering of a user from a linear path. The veering detection system 100 includes a processor 101, which may be specialized, that performs calculations based on one or more measurements performed by an inertial measurement unit ("IMU") 103. Further, the veering detection system 100 may store veering detection code 105 on a data storage device 104. The processor 101 may then execute the veering detection code 105 in a memory device 102 to perform the foregoing calculations.

Moreover, the IMU 103 may include various componentry (e.g., one or more accelerometers, gyroscopes, and/or magnetometers) that may be used to perform various inertial measurements (e.g., yaw, pitch, and/or roll). Once the processor 101 determines, or is alerted to, the starting point of the linear path, the processor 101 may then determine a trajectory along the linear path, and any veering from that trajectory. For example, the processor 101 may establish that, at the starting point of the linear path, the user has an angular displacement of zero degrees about a yaw axis of the user. The processor 101 may then monitor, continuously or in periodic increments, yaw measurements received from the IMU 103 to determine if any of the received yaw measurements exceeds a predetermined angular threshold (e.g., an angular displacement of twenty-five to thirty-five degrees along the yaw axis). Additionally, the processor 101 may also monitor various other measurements received from the IMU 103, such as angular velocity. For example, if the processor 101 determines that both the predetermined angular threshold and a predetermined angular velocity threshold (e.g., seven native angular velocity units) have been exceeded, the processor 101 may deduce that the user is performing a purposeful turn. (A user tends to make a relatively quick motion when intentionally performing a turn.) Conversely, if the processor 101 determines that the predetermined angular threshold is exceeded, but the predetermined angular velocity threshold is not exceeded, the processor 101 may deduce that the user is performing a veering motion (i.e., a drifting motion).

Although examples of ranges of the predetermined angular threshold and predetermined angular velocity have been provided, such examples are not intended as limiting examples. Accordingly, the configurations provided for herein may be used with different values, or ranges of values, than those described herein with respect to the predetermined angular threshold and predetermined angular velocity.

In one embodiment, the processor 101 determines that the linear path has been initiated by receiving a calibration input from a calibration actuator 108 (e.g., button, microphone, etc.) that has been activated by a user. For example, at the initiation of walking along a crosswalk, the user may press a button to indicate that the user intends to start walking along a linear path. At the completion of the linear path, the user may press the same, or different, button to indicate that walking along that particular linear path has been completed. As another example, the user may provide voice commands, via a microphone, to indicate to the processor 101 when walking along the linear path has been initiated and/or completed.

In yet another embodiment, a positioning component 109 (e.g., GPS, motion capture, etc.) may be used to automatically determine when the user has started and/or completed moving along a linear path. In other words, an input from the user indicating when the walking along the linear path has been initiated or completed may be unnecessary, Optionally, the veering detection system 100 may have both the calibration actuator 108 and the positioning component 109 to provide the user with two layers of linear path calculation.

Further, in another embodiment, elevational displacement may be a factor for determining when a user has started, or completed, motion along a linear path. As an example, a user may step down off of a sidewalk to initiate walking along a crosswalk, and step onto a sidewalk on the opposing end of the crosswalk to complete the motion along the crosswalk. The veering detection system 100 may use the IMU 103 to sense inertial displacements along a vertical axis, which may be used to initiate/stop monitoring along the linear path.

Upon determining that a user is veering from the linear path trajectory, the veering detection system 100 determines the side (e.g., left or right), from the perspective of the user, of the veering occurrence. For example, as the user is facing a crosswalk, the veering detection system 100 may determine that the user has veered thirty degrees to the right side of the user. Accordingly, the veering detection system 100 may provide a non-visual output command to a right non-visual output device 107 (e.g., haptic vibration unit, audio speaker, etc.) to alert the user, who is visually impaired, that he or she is veering to the right, and should move more to the left to resume walking along the linear path. Conversely, the veering detection system 100 may provide a non-visual output command to a left non-visual output device 106 (e.g., haptic vibration unit, audio speaker, etc.) to alert the user, who is visually impaired, that he or she is veering to the left, and should move more to the right to resume walking along the linear path.

Although the veering detection system 100 is described as differentiating veering from purposeful turns, the veering detection system 100 may be implemented without determining purposeful turns. For example, the veering detection system 100 may be implemented to determine a veer based on angular displacement without angular velocity. Various other criteria may, or may not, be used in conjunction with angular displacement.

In one embodiment, the veering detection system 100 may include an internal power source (e.g., battery) to power operation of the veering detection system 100. In another embodiment, the veering detection system 100 may be powered (through a wired or wireless connection) via an external power source.

Figure 2:
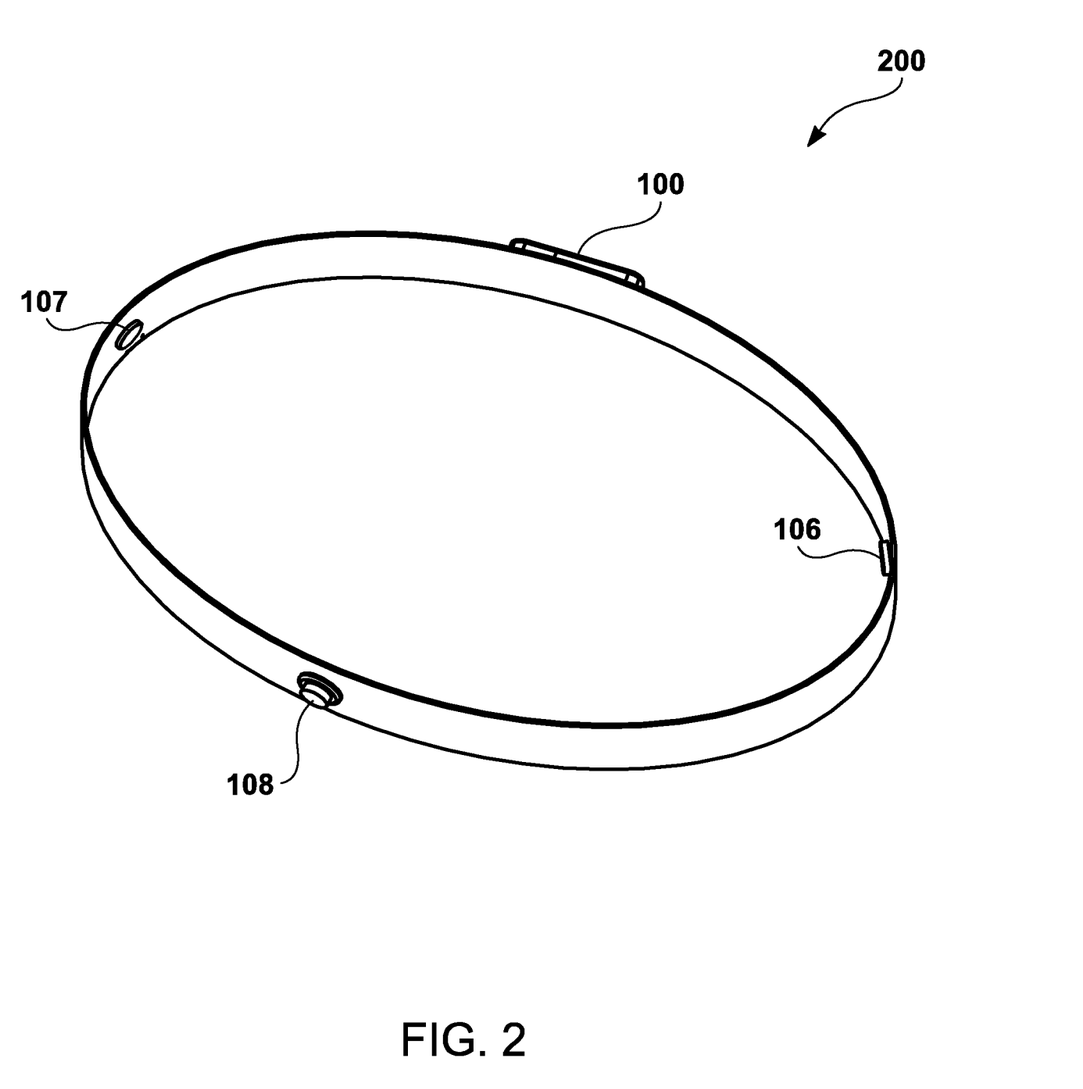
FIG. 2 illustrates a wearable apparatus to which the veering detection system, the left non-visual output device, the right non-visual output device, and the calibration actuator may be adhered.

FIG. 2 illustrates a wearable apparatus 200 to which the veering detection system 100, the left non-visual output device 106, the right non-visual output device 107, and the calibration actuator 108, illustrated in FIG. 1, may be adhered. As an example, the wearable apparatus 100 may be a waistband that may be positioned around the waist of the user. The left non-visual output device 106 may be adhered (e.g., via injection molding, adhesive, clips, screws, bolts, pins, etc.) to the wearable apparatus 200 such that the left non-visual output device 106 is in proximity to the left hip of the user. Conversely, the right non-visual output device 107 may be adhered (e.g., via injection molding, adhesive, clips, screws, bolts, pins, etc.) to the wearable apparatus 200 such that the right non-visual output device 107 is in proximity to the right hip of the user. As a result, the user experiences a non-visual output (e.g., vibration) on the side to which the user is veering from the linear path, thereby alerting the user to move in the opposite direction back toward the linear path. Alternatively, the non-visual output may be emitted toward the side in which the user should move to return to the linear path (e.g., a right side vibration to indicate that the user has veered too much to the left, and should move rightward to return to the linear path).

Further, the veering detection system 100 may also be adhered to the wearable apparatus 200. Although illustrated at the rear of the wearable apparatus 200, the veering detection system 100 may, alternatively, be positioned at various positions (e.g., front, sides, etc.) of the wearable apparatus 200. Further, the veering detection system 100 may be adhered to the wearable apparatus 200 so that it is visible, as illustrated, or may be adhered to the wearable apparatus 200 so that it is integrated within the wearable apparatus 200 (i.e., internal to the wearable apparatus 200).

Moreover, various additional componentry may be positioned along, or integrated within, the wearable apparatus 200. For example, a calibration actuator 108 may be positioned at the front, or at various other positions, of the wearable apparatus 200 to allow a user to provide a calibration input to establish the starting point for the linear path.

As another example, a connector (e.g., magnetic) may be positioned along the wearable apparatus 200 to allow a user to separate, and reconnect, the wearable apparatus 200 for placement around the waist of the wearable apparatus 200. Accordingly, the wearable apparatus 200 may be fabricated from an expandable material that does not necessitate a connector, or may be fabricated to act as a belt with a connector, such as a belt buckle.

Although the wearable apparatus 200 is illustrated and described in the context of a material that surrounds the waist of a user (e.g., waist band, belt, etc.), the wearable apparatus 200 may, alternatively, surround other areas of the user such as the following: head (e.g., headband), arm (armband), elbow (elbow band), wrist (wristband), knee (knee band), thigh (thigh band), or ankle (ankle band).

Finally, the veering detection system 100 may communicate with the non-visual output devices 106 and 107 via wired (e.g., cables integrated within the wearable apparatus 200 or adhered externally to the wearable apparatus 200) or wireless communication.

Figure 3:
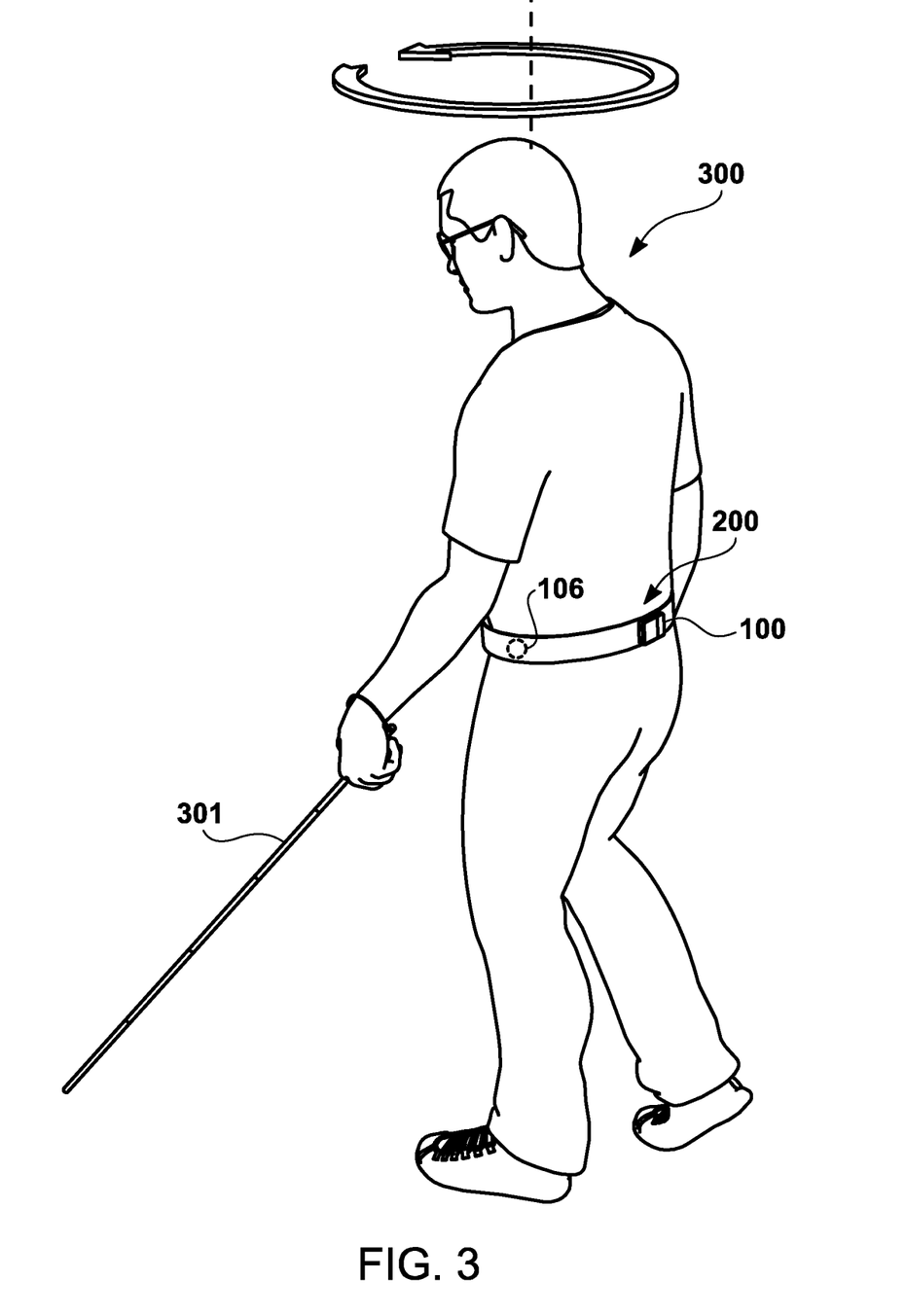
FIG. 3 illustrates an example of a user that wears the wearable apparatus, illustrated in FIG. 2, around his or her waist.

FIG. 3 illustrates an example of a user 300 that wears the wearable apparatus 200, illustrated in FIG. 2, around the waist of the user. The user 300 may use a cane 301 in conjunction with the wearable apparatus 200. For example, when the user 300 is not walking along a linear path, the user 300 may use the cane 301 to detect obstacles, and avoid those obstacles. Optionally, the user 300 may use the cane 301 to determine the starting point and/or completion point of a linear path. For example, the user 300 may use the cane 301 to detect an elevational displacement (e.g., a step down from a sidewalk that may be indicative of the start of a crosswalk or a step up from a crosswalk that may be indicative of the end of the crosswalk).

For ease of illustration, a yaw axis, about which angular displacement and angular velocity of the user 300 may be measured, is illustrated.

Figure 4A:
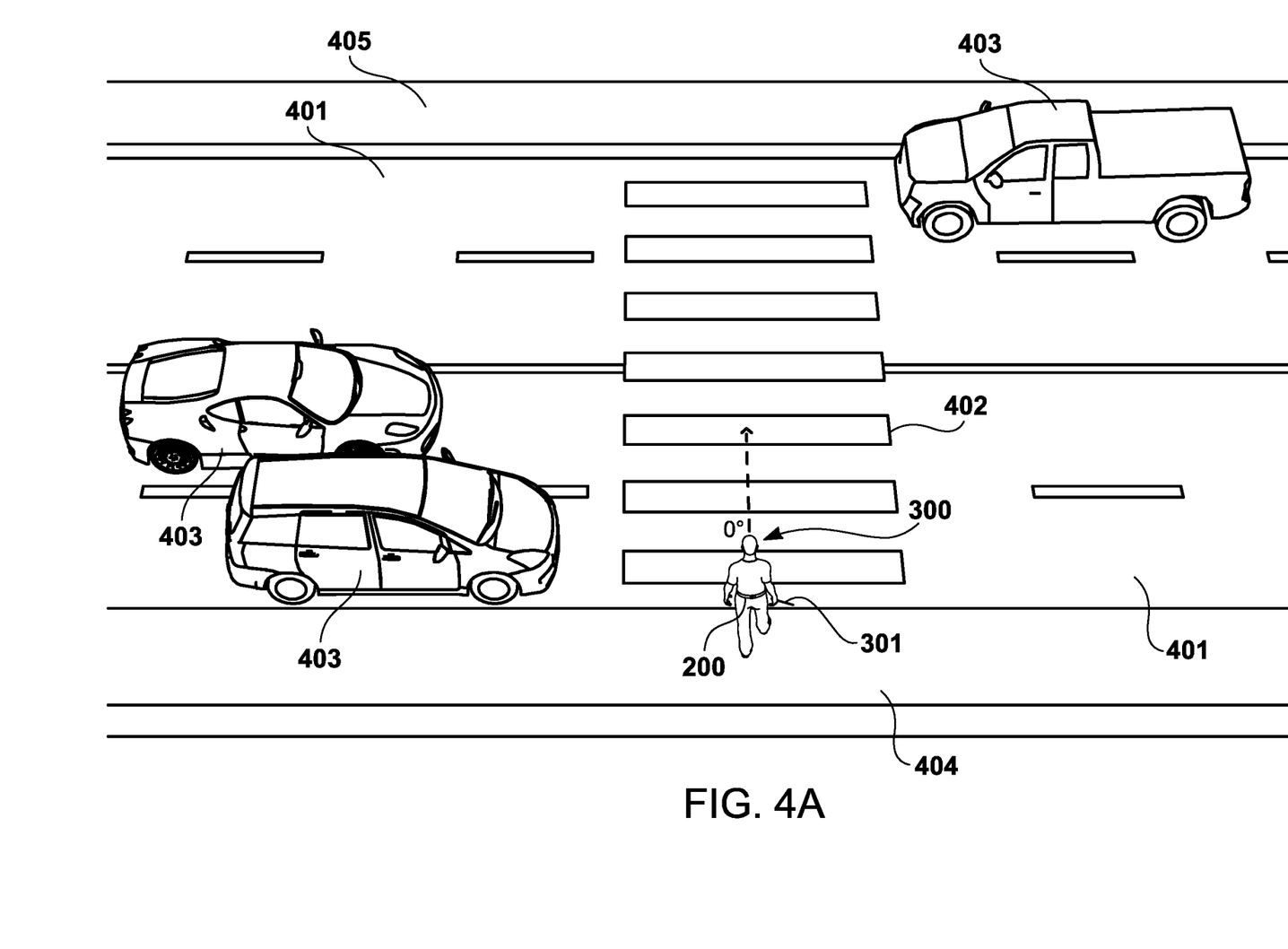
FIG. 4A illustrates an example of the user, who is wearing the wearable apparatus, starting to walk on a linear path via a crosswalk in a street, which may have a number of vehicles.

FIGS. 4A-4E illustrate an example of the user 300, illustrated in FIG. 3, wearing the wearable apparatus 200, illustrated in FIG. 2. As illustrated in FIG. 4A, the user 300, who is wearing the wearable apparatus 200, starts walking on a linear path via a crosswalk 402 in a street 401, which may have a number of vehicles 403. Either through manual input (e.g., via the calibration actuator 108 illustrated in FIGS. 1 and 2) or automatic detection (e.g., GPS detection of the crosswalk 402, elevational displacement detected by the IMU 103, etc.), the veering detection system 100, illustrated in FIG. 1, calibrates the starting point of the linear path at the beginning of the crosswalk 402. For ease of illustration, a linear trajectory and angular displacement form that linear trajectory are illustrated. At initial calibration, the angular displacement may be approximately zero degrees.

Figure 4B:
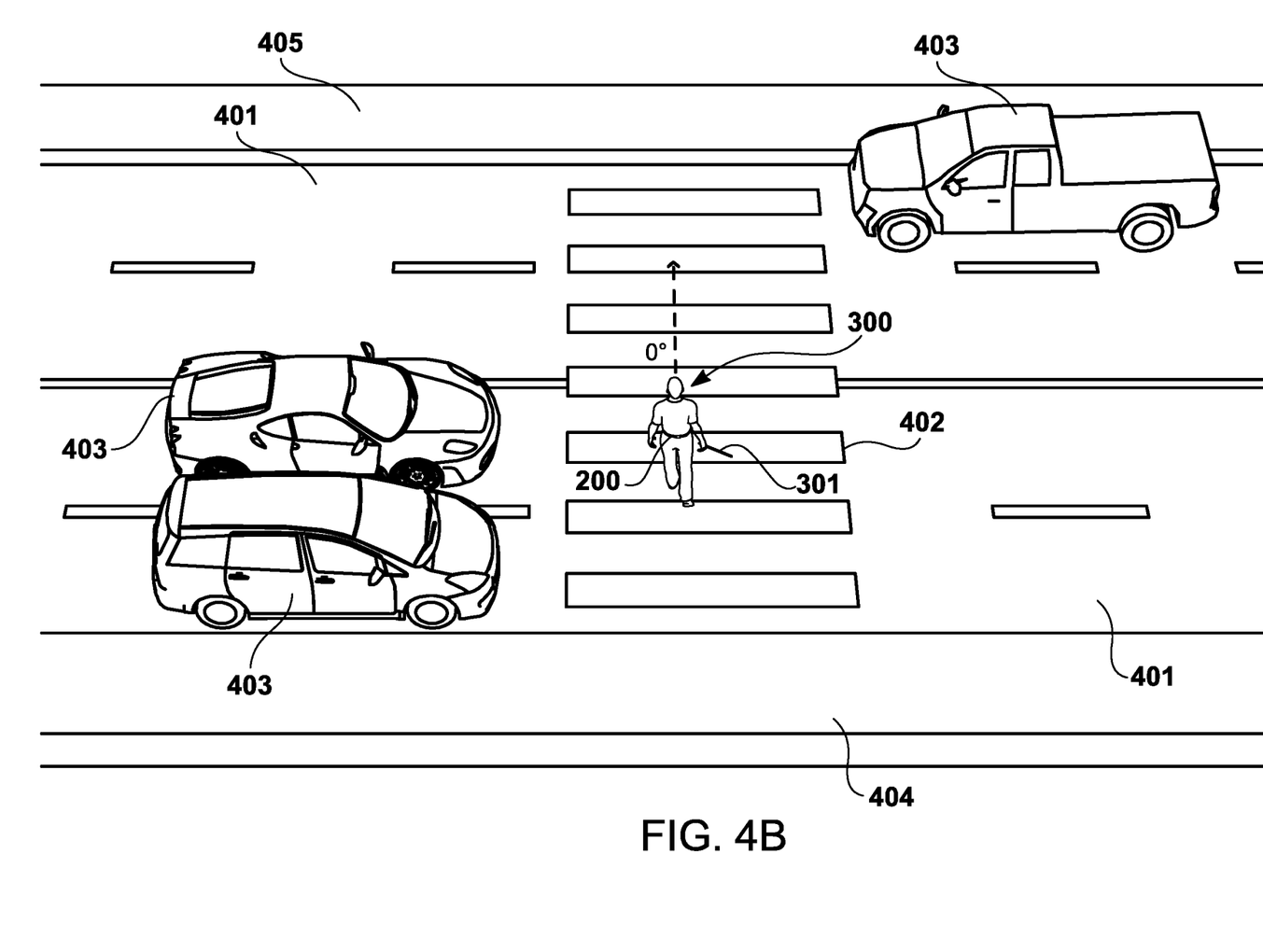
FIG. 4B illustrates an example of the user having walked through a portion of the crosswalk, while moving substantially along the linear path.

With respect to FIG. 4B, the user 300 has walked through a portion of the crosswalk 402, while moving substantially along the linear path (e.g., an angular deviation corresponding to an angular displacement of less than twenty-five degrees). As a result, at this point of movement along the crosswalk 402, no non-visual output is emitted via the wearable apparatus 200 to the user 300.

Figure 4C:
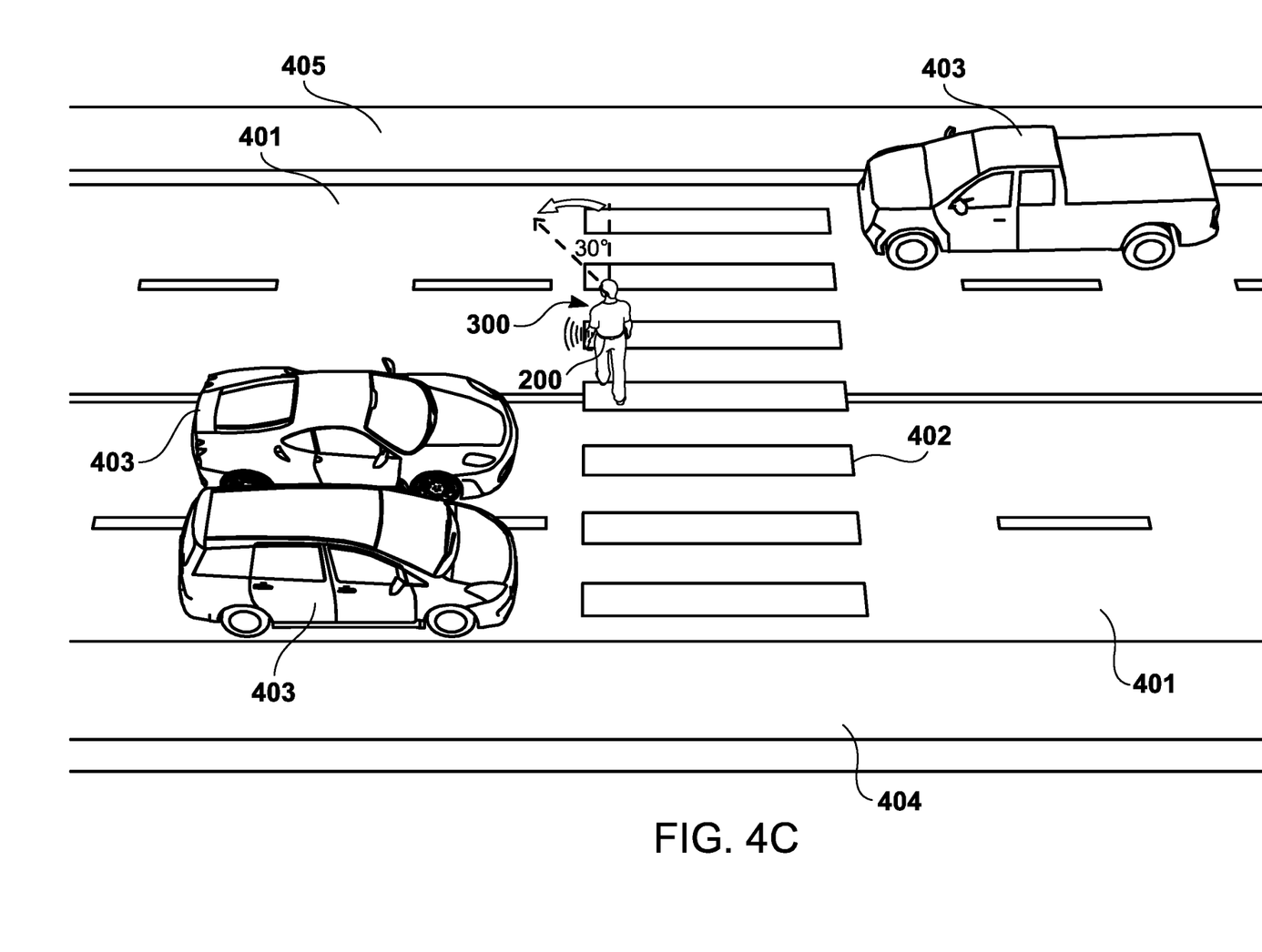
FIG. 4C illustrates an example of the user having moved further along the crosswalk, and appearing to be veering from the trajectory of the calibrated linear path.

Yet, with respect to FIG. 4C, the user 300 has moved further along the crosswalk 402, and appears to be veering from the trajectory of the calibrated linear path. For example, the user 300 appears to be drifting toward the leftward edge of the crosswalk 402 (e.g., at an angular displacement of thirty degrees), and possibly into the street 401 where the plurality of vehicles 403 is positioned. Accordingly, the veering detection system 100, illustrated in FIG. 1, detects that the user 300 has veered at an angular displacement (e.g., thirty degrees) that exceeds the predetermined angular displacement threshold (e.g., twenty-five degrees). Further, the veering detection system 100 determines that such angular displacement is associated with an angular velocity that does not exceed the predetermined angular velocity threshold, which is indicative of a veering movement. As a result, the veering detection system provides a non-visual output command to the right non-visual output device 107, illustrated in FIGS. 1 and 2, to emit a non-visual output (e.g., haptic vibration) that is in proximity to the left hip of the user 300.

Figure 4D:
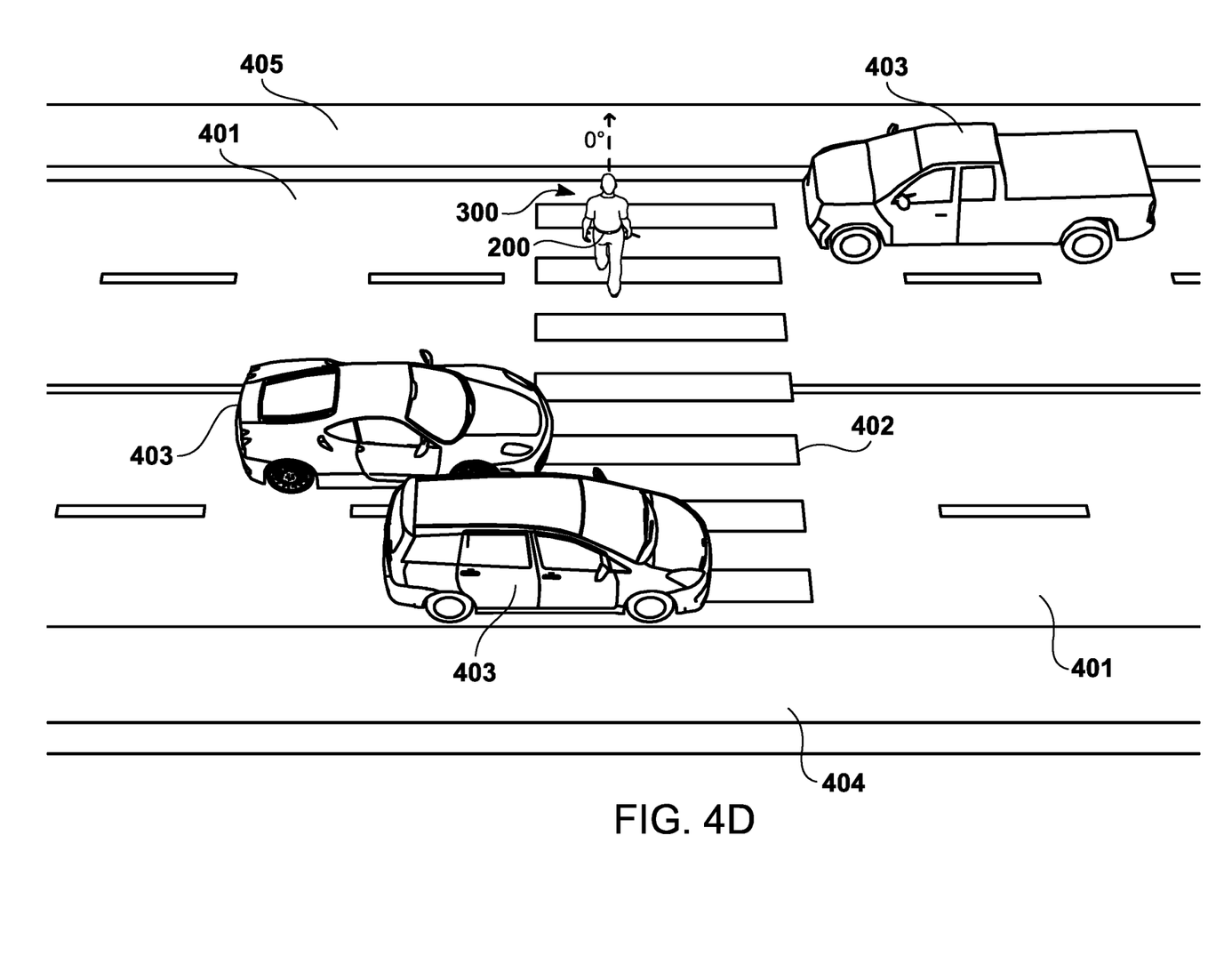
FIG. 4D illustrates an example of the user being guided back in the direction of the linear path after having received the non-visual output.

After receiving the non-visual output, the user 300 is essentially guided back in the direction of the linear path, as illustrated in FIG. 4D. In other words, the user 300 may continue to receive the non-visual output until he or she returns to movement that does not exceed predetermined angular threshold (e.g., an angular displacement of less than twenty-five degrees).

Figure 4E:
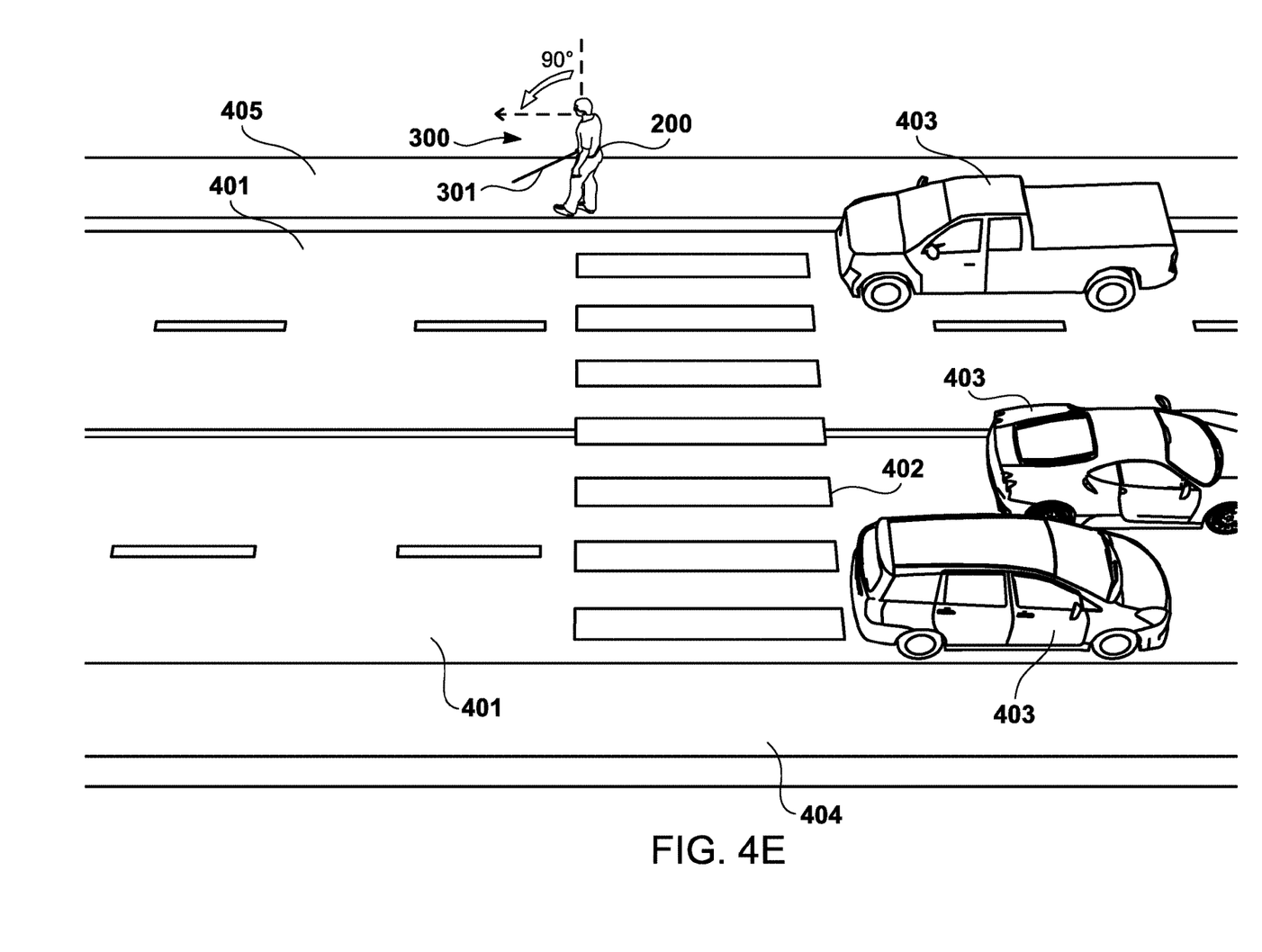
FIG. 4E illustrates an example of the user having completed the motion across the crosswalk.

Finally, with respect to FIG. 4E, the user 300 has completed the motion across the crosswalk 402. The veering detection system 100 may have determined such completion via a manual input to calibration actuator 108, illustrated in FIGS. 1 and 2, or an automatic determination via the GPS device 109 (location-based) or the IMU 103 (elevation-based). Alternatively, the veering detection system 100 may determine completion of walking through a linear path via a purposeful turn. For example, the user 300 purposefully turns left on the sidewalk after completing the motion across the crosswalk 402. The veering detection system 100 may detect such a purposeful turn, and determine that the motion along the linear path has been completed. With any of the determinations by the veering detection system 100 that the motion along the linear path has been completed, the veering detection system 100 may necessitate a new calibration for a starting point of a new linear path.

Figure 5:
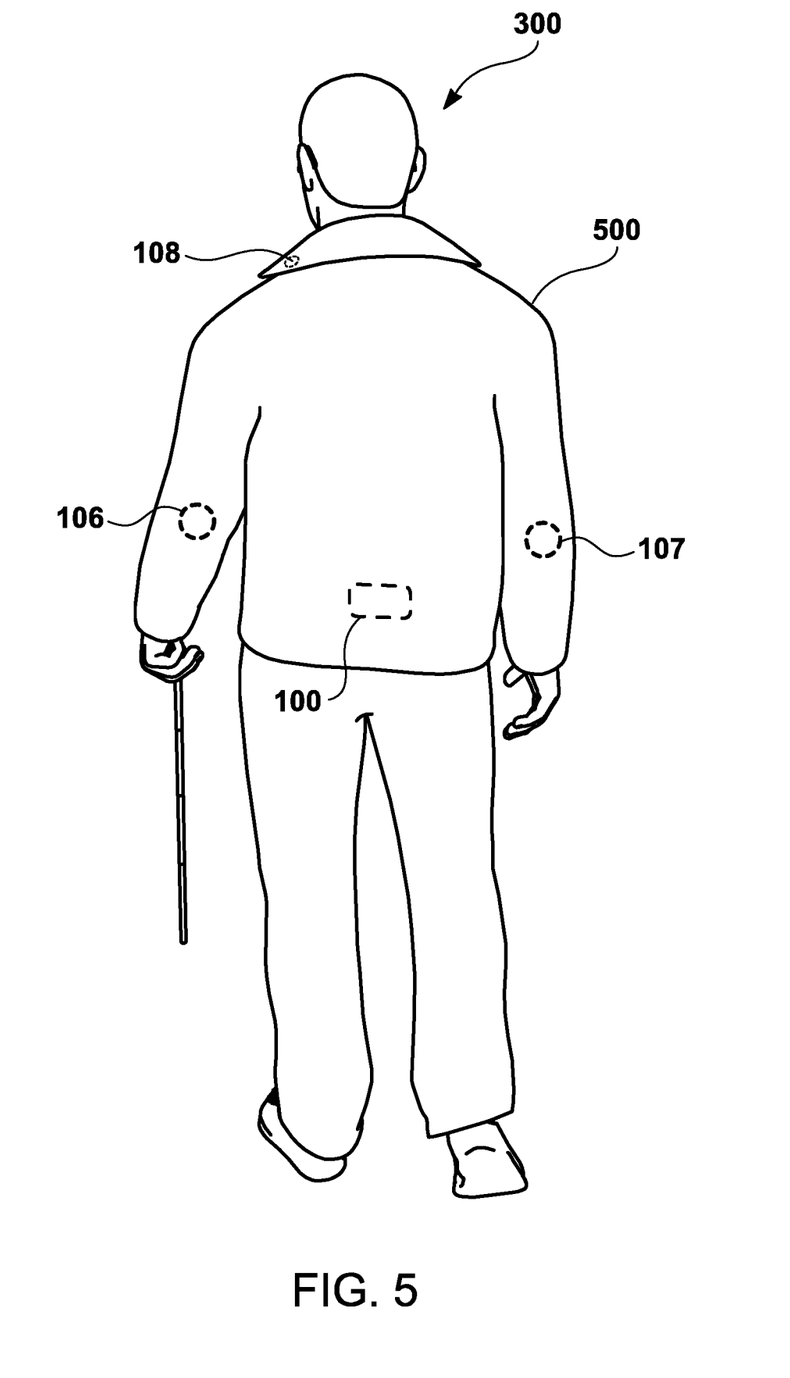
FIG. 5 illustrates a wearable apparatus, which may be an article of clothing, to which the veering detection system and/or visual non-output devices may be adhered.

FIG. 5 illustrates a wearable apparatus 500, which may be an article of clothing, to which the veering detection system 100, the visual non-output devices 106 and 107, and/or the calibration actuator 108 may be adhered. As an example, the wearable apparatus 500 may be a jacket in which the veering detection system 100 may be positioned. Further, the left non-visual output device 106 and the right non-visual output device 107 may be positioned on corresponding sides (e.g., arm portions, elbow portions, shoulder portions, etc.) of the jacket. Further, as an example, the calibration actuator 108 (e.g., microphone, button, etc.) may positioned along a collar of the jacket 500. Although a jacket is illustrated, various other forms of clothing (e.g., shirt, sweatshirt, pants, etc.) may be used instead.

As an alternative to the illustrated configurations, some of the componentry may be positioned on the wearable apparatus 200, illustrated in FIG. 2, or the wearable apparatus 500, illustrated in FIG. 5. For example, the veering detection system 100 may be positioned on the cane 301, illustrated in FIG. 3, whereas the non-visual output devices 106 and 107 may be positioned on the wearable apparatus 200 illustrated in FIG. 2 or the wearable apparatus 500 illustrated in FIG. 5. As another example, the veering detection system 100 may be positioned on the wearable apparatus 200 or the wearable apparatus 500, whereas the non-visual output devices 106 and 107 may be externally situated devices that are hand-held.

As another alternative to the illustrated configurations, each of the components may be worn by the user by a distinct connector, without a unitary wearable apparatus. For example, a plurality of clips, or other types of connectors (e.g., magnets), may be used to connect each of the components (e.g., veering detection system 100, left non-visual output device 106, and right non-visual output device 107) to the user 300, illustrated in FIG. 3.

Figure 6:
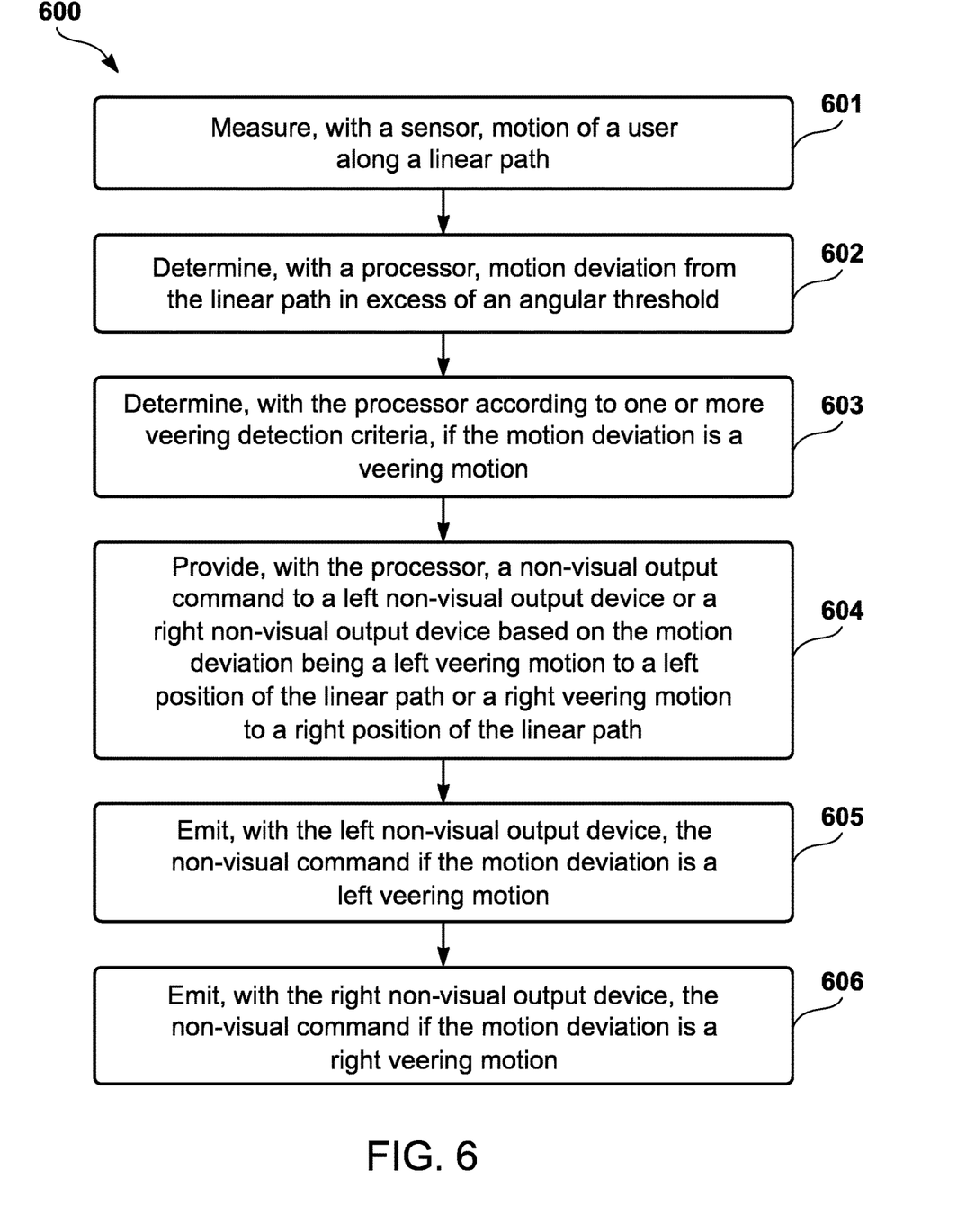
FIG. 6 illustrates a process that may be used to detect a user veering from the motion of a linear path.

FIG. 6 illustrates a process 600 that may be used to detect a user veering from the motion of a linear path. At a process block 601, the processor 101, illustrated in FIG. 1, measures, with a sensor (e.g., IMU 103), motion of the user 300, illustrated in FIG. 3, along a linear path. In one embodiment, the motion is ambulatory motion, such as walking. In another embodiment, the motion may be motion resulting from the user being positioned on, or in, an apparatus (e.g., scooter, wheelchair, etc.) that performs the motion.

Further, at a process bock 602, the process 600 determines, with the processor 101 (FIG. 1), motion deviation from the linear path in excess of an angular threshold (predetermined or calculated on-the-fly). Moreover, at a process block 603, the process 600 determines, with the processor 101 according to one or more veering detection criteria, if the motion deviation is a veering motion.

At a process block 604, the process 600 provides, with the processor 101, a non-visual output command to a left non-visual output device 106 or a right non-visual output device 107, as illustrated in FIG. 2, based on the motion deviation being a left veering motion to a left position of the linear path or a right veering motion to a right position of the linear path. The left non-visual output device 106 is positioned on a left side of the user 300. The right non-visual output device is positioned on the right side of the user 300. Additionally, at a process block 605, the process 600 emits, with the left non-visual output device 106, the non-visual command if the motion deviation is a left veering motion. Further, at the process block 606, the process 600 emits, with the right non-visual output device 107, the non-visual command if the motion deviation is a right veering motion.

Finally, although the process 600 may implemented for a user 300 that is visually impaired, the process 600 may also be used by a user that is not visually impaired. Providing a non-visual output may be of benefit to such a user during certain activities in which visual focus is difficult, or inconvenient. For example, a user that is not visually impaired may be walking across the crosswalk 402, illustrated in FIG. 4, while sending a text message on a mobile device. Given that the visual focus of that user is on the display screen of the mobile device, rather than the surroundings of the crosswalk, the process 600 may be of particular benefit to such user to alert the user to possible veering during preparing and/or sending a text message, or performing other activities via the mobile device. As a particular implementation, the mobile device may have a left haptic vibration unit positioned on the left side of the mobile device and a right haptic vibration unit positioned on the right side of the mobile device to alert the user to potential veering. In another implementation, the mobile device may display a visual alert on the right side or the left side of the display screen to alert the user to potential veering.

The configurations provided for herein are described with respect to particular calculations that may be performed according to one or more predetermined angular displacements and/or one or more predetermined angular velocities. In another embodiment, the calculations may be customized (i.e., the angular displacements and/or angular velocities do not have to be predetermined), or even adjusted on-the-fly, for the particular user 300, illustrated in FIG. 3. For example, the veering detection system 100 may transmit veering motion data to a remotely located server that may analyze the veering motion data, and determine angular displacement and angular velocity thresholds that are optimal for a particular user 300. Further, the remotely located server may use machine learning for that particular user 300 to periodically adjust such thresholds based on various performance metrics (e.g., what thresholds reduce or increase the number of vibrations emitted for a particular user 300). As an alternative, the foregoing functionality may be wholly, or partially, performed by the processor 101 within the veering detection system 100, rather than entirely by the remotely located server.

It is understood that the apparatuses and processes described herein may also be applied in other types of apparatuses. Those skilled in the art will appreciate that the various adaptations and modifications of the embodiments of the apparatuses and processes described herein may be configured without departing from the scope and spirit of the apparatuses and processes. Therefore, it is to be understood that, within the scope of the appended claims, the present apparatuses and processes may be practiced other than as specifically described herein.

We claim:

1. A system comprising:
a wearable apparatus to be worn by a user;
a sensor that adheres to the wearable apparatus, the sensor measuring ambulatory motion of the user along a linear path;
a processor that adheres to the wearable apparatus, the processor determining ambulatory motion deviation from the linear path according to the ambulatory motion being in excess of a predetermined angular threshold, the processor determining according to one or more veering detection criteria if the ambulatory motion deviation is a veering motion or a purposeful turn;
a left non-visual output device that adheres to a left side of the wearable apparatus such that the left non-visual output device is positioned in proximity to a left side of the user, the left non-visual output device receiving, from the processor, a non-visual output command based on the ambulatory motion deviation being a left veering motion to a left position of the linear path, the left non-visual output device emitting the non-visual output command; and a right non-visual output device that adheres to a right side of the wearable apparatus such that the right non-visual output device is positioned in proximity to a right side of the user, the right non-visual output device receiving, from the processor, the non-visual output command based on the ambulatory motion deviation being a right veering motion to a right position of the linear path, the right non-visual output device emitting the non-visual output command.

2. The system of claim 1, wherein the wearable apparatus is selected from the group consisting of: a waistband and a belt.

3. The system of claim 1, wherein the wearable apparatus is selected from the group consisting of: a jacket and a shirt.

4. The system of claim 1, wherein the non-visual output command is a vibration that alerts the user to a veering direction.

5. The system of claim 4, wherein the left non-visual output device is a left haptic vibration unit, wherein the right non-visual output device is a right haptic vibration unit.

6. The system of claim 1, further comprising a calibration actuator that adheres to the wearable apparatus, the calibration actuator being activated to calibrate a starting position of the linear path.

7. The system of claim 6, wherein the calibration actuator is a button.

8. The system of claim 1, wherein the one or more veering detection criteria include exceeding a predetermined angular displacement threshold.

9. The system of claim 8, wherein the one or more veering detection criteria further include exceeding the predetermined angular displacement threshold at a predetermined angular velocity threshold.

10. The system of claim 9, wherein the sensor measures the ambulatory motion according to one or more inertial measurements.

11. The system of claim 10, wherein one or more inertial measurements is selected from the group consisting of: pitch, roll, and yaw.

12. The system of claim 1, wherein the sensor comprises one or more accelerometers.

13. The system of claim 1, wherein the sensor comprises one or more gyroscopes.

14. A system comprising:
a plurality of wearable apparatuses to be worn by a user;
a sensor that adheres to at least one of the plurality of wearable apparatuses, the sensor measuring ambulatory motion of the user along a linear path;
a processor that adheres to at least one of the plurality of wearable apparatuses, the processor determining ambulatory motion deviation from the linear path according to the ambulatory motion being in excess of a predetermined angular threshold, the processor determining according to one or more veering detection criteria if the ambulatory motion deviation is a veering motion or a purposeful turn;
a left non-visual output device that adheres to at least one of the plurality of wearable apparatuses such that the left non-visual output device is positioned in proximity to a left side of the user, the left non-visual output device receiving, from the processor, a non-visual output command based on the ambulatory motion deviation being a left veering motion to a left position of the linear path, the left non-visual output device emitting the non-visual output command; and
a right non-visual output device that adheres to at least one of the plurality of wearable apparatuses such that the right non-visual output device is positioned in proximity to a right side of the user, the right non-visual output device receiving, from the processor, the non-visual output command based on the ambulatory motion deviation being a right veering motion to a right position of the linear path, the right non-visual output device emitting the non-visual output command.

15. A computer program product comprising a non-transitory computer useable storage device having a computer readable program, wherein the computer readable program when executed on a computer causes the computer to:
measure, with a sensor, motion of a user along a linear path;
determine, with a processor, motion deviation from the linear path in excess of an angular threshold;
determine, with the processor according to one or more veering detection criteria, if the motion deviation is a veering motion;
provide, with the processor, a non-visual output command to a left non-visual output device or a right non-visual output device based on the motion deviation being a left veering motion to a left position of the linear path or a right veering motion to a right position of the linear path, the left non-visual output device being positioned on a left side of the user, the right non-visual output device being positioned on the right side of the user; and
emit, with the left non-visual output device, the non-visual command if the motion deviation is a left veering motion; and
emit, with the right non-visual output device, the non-visual command if the motion deviation is a right veering motion.

16. The computer program product of claim 15, wherein the one or more veering detection criteria include exceeding an angular displacement threshold.

17. The computer program product of claim 16, wherein the one or more veering detection criteria further include exceeding the angular displacement threshold at an angular velocity threshold.

18. The computer program product of claim 17, wherein the computer is further caused to measure the motion according to one or more inertial measurements.

19. The computer program product of claim 18, wherein one or more inertial measurements is selected from the group consisting of: pitch, roll, and yaw.

20. The computer program product of claim 15, wherein the non-visual output command is a vibration that alerts the user to a veering direction.

* * * * *